United States Patent Office 2,896,813
Patented July 28, 1959

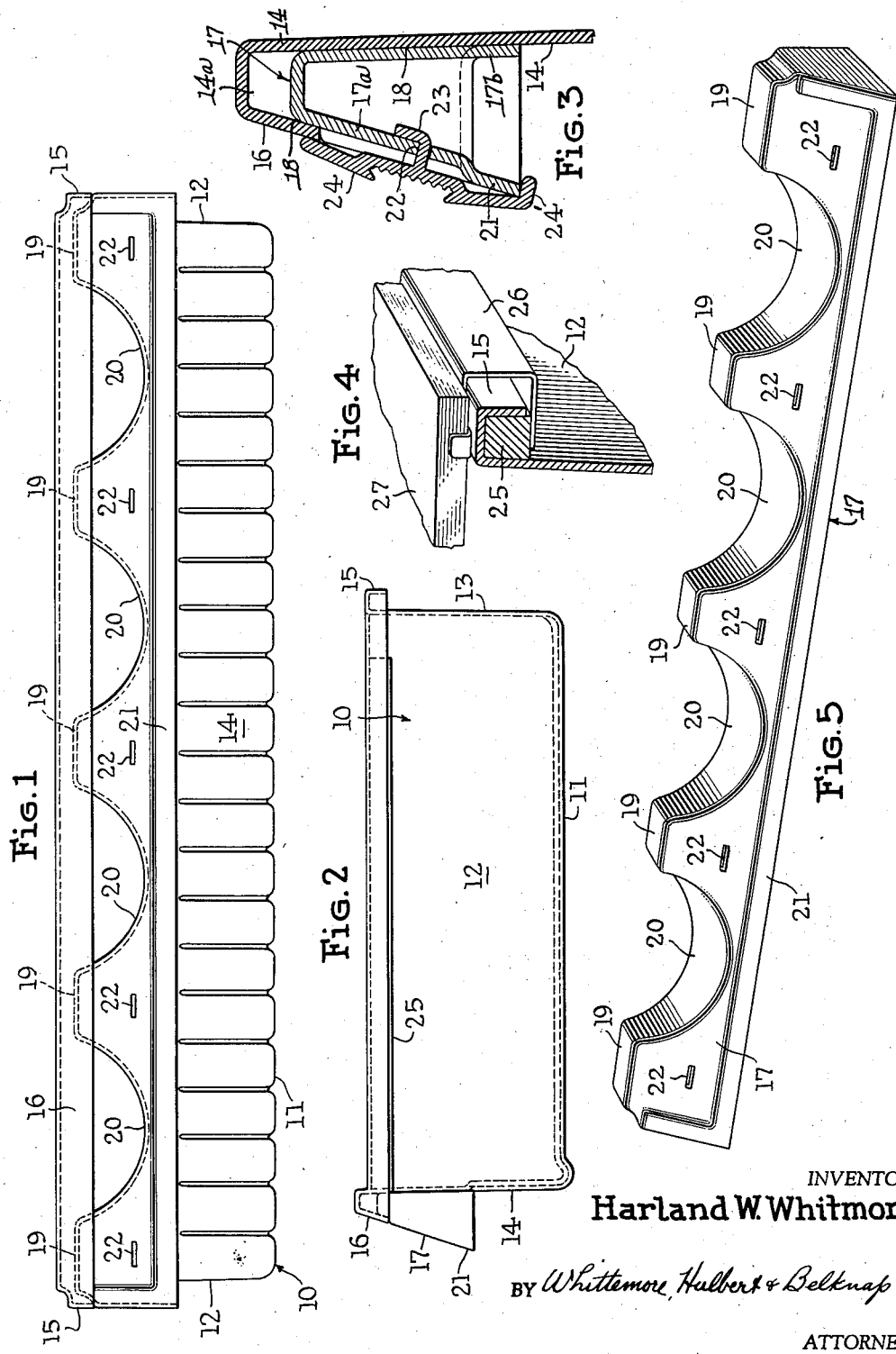

2,896,813

REFRIGERATOR CRISPER PAN ASSEMBLY

Harland W. Whitmore, Libertyville, Ill., assignor, by mesne assignments, to Amana Refrigeration, Inc., Amana, Iowa, a corporation of Iowa Application November 25, 1955, Serial No. 548,816

3 Claims. (Cl. 220—94)

The present invention relates to crisper pans for household refrigerators and more particularly the front handle portion of the pan.

Many types of conventional crisper pans are molded from plastic material and are provided at the front top edge with a downturned flange or lip to provide a handle whereby the pan may be pulled out to permit access thereto. At times, as when the pan is fully loaded with vegetables and the like, the weight of the loaded pan is such that considerable strain is imposed on the handle portion of the pan. This strain may result in cracking or accidental breakage of the handle.

It is, therefore, one of the objects of this invention to provide reinforcing means for the handle portion of a crisper pan of the type referred to.

It is also an object of the invention so to form the reinforcing means that it is not only structurally strong but is readily assembled with the crisper pan.

Other objects will be apparent from the following description of a preferred embodiment of the invention when taken with the accompanying drawings in which—

Fig. 1 is a front elevation of a crisper pan and the handle reinforcement, parts being broken away better to illustrate the improvement;

Fig. 2 is a side view of the pan shown in Fig. 1;

Fig. 3 is an enlarged fragmentary section of the handle shown in Fig. 1 and further showing a trim strip therefor;

Fig. 4 is an enlarged fragmentary perspective of the supporting rail for the crisper pan and a glass shelf;

Fig. 5 is a perspective of the handle.

Referring to the drawings, the crisper pan designated 10 is a one-piece molded plastic substantially rectangular open-top receptacle having a bottom 11, sides 12, and rear and front walls 13 and 14 respectively. An open return bent flange 15 extends laterally outwardly from the upper edge of the pan throughout its periphery to form a downwardly opening pocket around all sides of the pan to strengthen the rim of the pan, to receive side bearing members, and to receive a reinforced handle. Preferably the portion 16 of the flange 15 at the front of the pan inclines downwardly and forwardly and cooperates with the adjacent upright front wall 14 of the pan to form a downwardly opening pocket 14a for a handle 17 extending across the crisper. The handle 17 comprises a molded plastic inverted channel, the front and rear walls 17a and 17b respectively thereof being parallel to flange 16 and front wall 14, respectively, so that when seated in the pocket 14a the channel-shaped handle 17 fits snugly therein. The handle 17 is firmly secured to the pan by a suitable cement applied at 18 to the abutting faces of the handle, pan, and flange, these faces being in flat surface to surface contact.

In order to provide a structurally strong handle the base or connecting web of the molded channel is formed with a plurality of longitudinally spaced substantially flat portions 19 lying in a common plane between which are recesses or inverted arches, as indicated at 20, these arches being terminally connected to the flat portions 19 and integral with and bridging the space between the front and rear flanges of the handle. It is to be noted that the arches 20 extend downwardly to points adjacent to the lower edge of the front wall 17a of the handle 17, the said front wall 17a being offset forwardly at 21 to provide a finger grip. At spaced points, preferably between each pair of adjacent arches, the front wall 17a of the handle 17 is apertured at 22 to receive tongues 23 on a trim plate 24, omitted in Fig. 1 but shown in section in Fig. 3. The tongues 23 are bent upwardly after insertion in the apertures 22 to lock the trim plate 24 to the handle 17. The upper edge of the trim plate 24 extends above and covers the lower edge of the depending flange portion 16 and the lower edge of the trim plate 24 is provided with an inturned flange 24' abutting and covering the lower edge of the offset portion 21.

In Fig. 4 there is shown means for further reinforcing the upper edge of each side wall and providing a bearing surface which cooperates with supporting slide rails secured to each of the side walls of the refrigerator liner. It will be seen that a bar 25, rectangular in cross-section and preferably an extruded plastic, fits in and is cemented to the pocket formed by the side flange 15. The lower surface of the bar 25 is spaced slightly below the lower edge of the flange 15 and is adapted to rest on slide rail 26. The rail also forms a rest for glass shelf 27 which forms a cover for the crisper when the latter is positioned within the refrigerator storage chamber.

While a preferred embodiment of the invention has been illustrated and described, it is not intended that it be limited to the exact configurations of parts shown in the drawings but such modifications as fall within the terminology of the claims may be made.

What is claimed is:

1. In combination with a crisper pan having an open return bent flange cooperating with its front wall to form a pocket, a handle secured in said pocket and including a vertical wall having a lower edge spaced from and forwardly of the front wall of said pan, said vertical wall having a plurality of spaced apertures, and a trim plate having a plurality of spaced tongues projecting from its rear face, said tongues being insertable in said apertures to secure said plate to said handle, said trim plate overlying the lower edges of said flange and said channel front wall and having an inturned flange along its lower edge, said inturned flange abutting and covering the lower edge of said vertical wall.

2. In combination, an open-top receptable provided with an open return bent downwardly extending flange cooperating with an adjacent upright wall of the receptacle to form a downwardly open pocket, a downwardly opening inverted channel secured within and extending below said pocket and constituting a hollow handle for the reception of the fingers of a hand, the front wall of said channel having a lower edge spaced from and forwardly of the front wall of said pan, and a trim plate overlying the lower edges of said downwardly extending flange and the adjacent front wall of said inverted channel and secured to said adjacent wall of the channel.

3. In combination, an open-top receptacle provided with an open return bent downwardly extending flange cooperating with an adjacent upright wall of the receptacle to form a downwardly opening pocket, a downwardly opening inverted channel within said pocket and constituting a hollow handle for the reception of the fingers of a hand, the base of said inverted channel having a plurality of longitudinally spaced substantially flat portions lying in a common horizontal plane spaced from but substantially parallel to the top of said open return bent flange and provided between said flat portions with substantially U-shaped portions terminally connected to said flat portions, and a trim plate overlying said downwardly extending flange and said U-shaped portions and secured to the adjacent wall of said inverted channel.

References Cited in the file of this patent

UNITED STATES PATENTS

| | | |
|---|---|---|
| 323,042 | Kerr | July 28, 1885 |
| 788,055 | Mathy | Apr. 25, 1905 |
| 1,862,131 | Woolson | June 7, 1932 |
| 1,910,426 | Courtwright | May 23, 1933 |
| 2,232,738 | Serr | Feb. 25, 1941 |
| 2,241,781 | Jackson | May 13, 1941 |
| 2,262,204 | Rideout | Nov. 11, 1941 |
| 2,331,845 | Rundell | Oct. 12, 1943 |
| 2,743,030 | Read | Apr. 24, 1956 |

FOREIGN PATENTS

| | | |
|---|---|---|
| 141,855 | Australia | Sept. 30, 1948 |